(12) United States Patent
Swanson

(10) Patent No.: US 10,257,272 B2
(45) Date of Patent: Apr. 9, 2019

(54) RANDOMIZED PEER-TO-PEER SYNCHRONIZATION OF SHARED CONTENT ITEMS

(71) Applicant: Dropbox, Inc., San Francisco, CA (US)

(72) Inventor: Eric Swanson, San Francisco, CA (US)

(73) Assignee: Dropbox, Inc., San Francisco, CA (US)

(*) Notice: Subject to any disclaimer, the term of this patent is extended or adjusted under 35 U.S.C. 154(b) by 0 days.

(21) Appl. No.: 16/010,789

(22) Filed: Jun. 18, 2018

(65) Prior Publication Data

US 2018/0302470 A1 Oct. 18, 2018

Related U.S. Application Data

(63) Continuation of application No. 15/294,641, filed on Oct. 14, 2016, now Pat. No. 10,021,184, which is a continuation of application No. 14/985,974, filed on Dec. 31, 2015, now Pat. No. 9,479,578.

(51) Int. Cl.
*H04L 29/08* (2006.01)
*G06F 17/30* (2006.01)

(52) U.S. Cl.
CPC .... *H04L 67/1095* (2013.01); *G06F 17/30165* (2013.01); *G06F 17/30174* (2013.01); *H04L 67/104* (2013.01)

(58) Field of Classification Search
CPC .................................................. H04L 67/1095
USPC .......................................................... 709/201
See application file for complete search history.

(56) References Cited

U.S. PATENT DOCUMENTS

2012/0123866 A1* 5/2012 Li .................. G06Q 30/00
                                                    705/14.55
2013/0198151 A1* 8/2013 Sentinelli .......... H04L 1/0045
                                                    707/693
2015/0067819 A1    3/2015 Shribman et al.

FOREIGN PATENT DOCUMENTS

EP    2112788 A1    10/2009
JP    2004-046874 A  2/2004
JP    2005-129061 A  5/2005
JP    2010-522386 A  7/2010

OTHER PUBLICATIONS

Japanese Office Action, Japanese Patent Application No. 2018-516411, dated Nov. 2, 2018, 5 pages.

* cited by examiner

*Primary Examiner* — Ondrej C Vostal
(74) *Attorney, Agent, or Firm* — Fenwick & West LLP

(57) ABSTRACT

A content management system synchronizes content items across client computing systems connected by a network. Client devices connected to peer devices on a LAN utilize peer-to-peer synchronization to synchronize content items. Client devices on the LAN broadcast namespaces synchronized on the client devices with other devices on the LAN. Client devices on the LAN connect to a subset of client devices that share a namespace with the connecting client device based on the broadcasts. Upon receiving a notification from the content management system that a new content item has been synchronized with the namespace a client device sends requests for a block comprising a content item to a subset of the connected devices. Additional block requests are sent in the order of randomized blocklist.

20 Claims, 14 Drawing Sheets

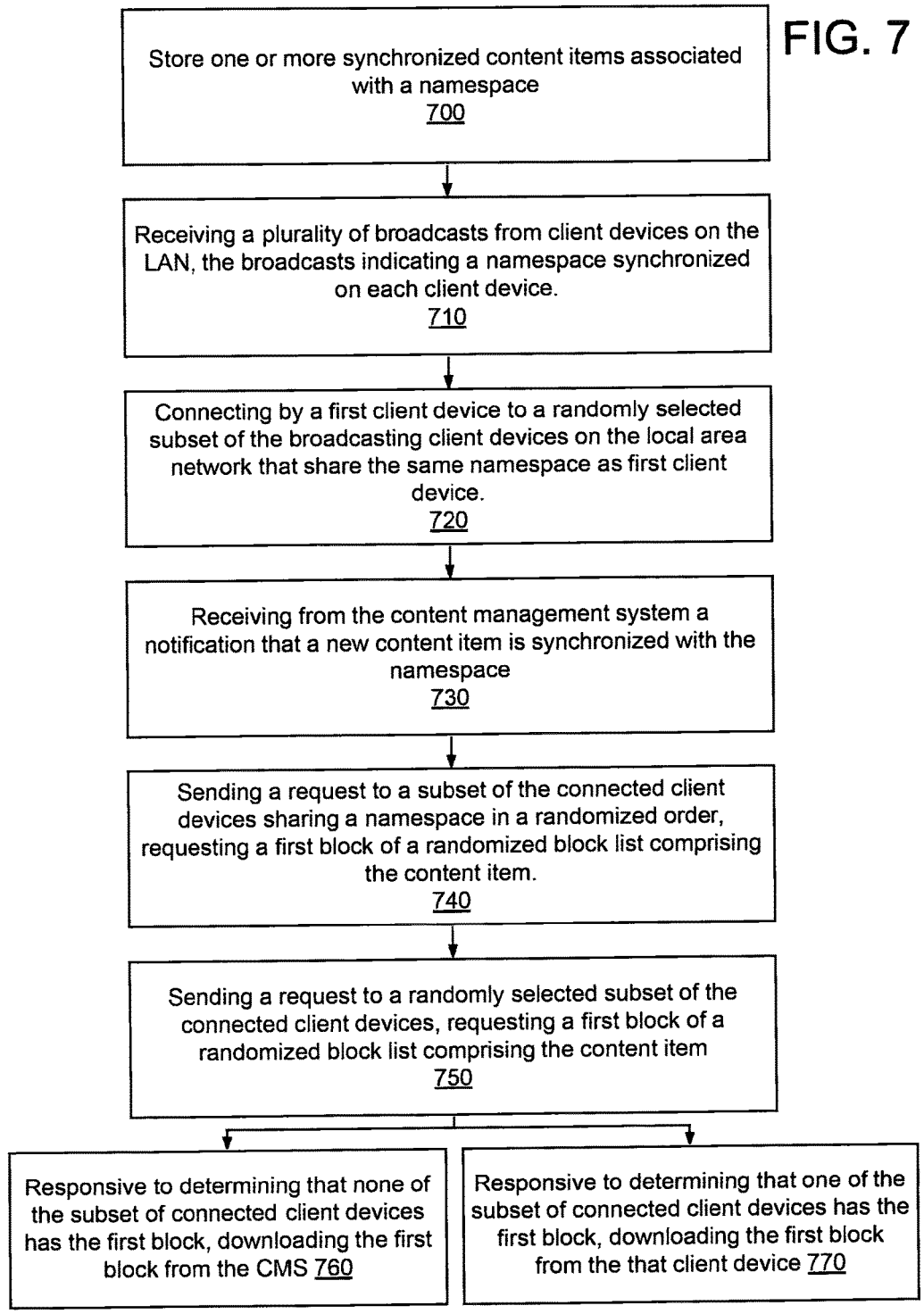

RANDOMIZED PEER-TO-PEER SYNCHRONIZATION OF SHARED CONTENT ITEMS

CROSS REFERENCE TO RELATED APPLICATIONS

This application is a continuation of U.S. application Ser. No. 15/294,641, filed Oct. 14, 2016, now U.S. Pat. No. 10,021,184, which is a continuation of U.S. application Ser. No. 14/985,974, filed Dec. 31, 2015, now U.S. Pat. No. 9,479,578, all of which are incorporated by reference in their entirety.

BACKGROUND

The described embodiments relate generally to improving the performance of computer systems providing content item synchronization, and particularly to improving the synchronization of content items between multiple client devices and a content management system where the multiple client devices are connected to a local area network (LAN).

Content management systems enable users to share content items from one client to another client. The clients are computing devices that provide content items to a content management system for storage and synchronization with other clients. The other clients may be operated by another user or may be devices registered or managed by the same user. A user designates which content items or directories containing content items are available to be shared with other users, and thus synchronized to the client devices of such users. Generally, a content management system synchronizes a given content item with all of the client devices that have been designated to share the content item. Typically, sharing content items with other client devices is accomplished by a first client device uploading the shared content item (or edits to a content item) to the server of the content management system and then downloading by a second client device the shared content item.

In some cases where many client devices are connected to each other over the same LAN, client devices may request new and updated shared content items from client devices on the LAN instead of requesting them from the server.

BRIEF DESCRIPTION OF THE DRAWINGS

FIG. 7 is a flow diagram of a method of randomized peer-to-peer synchronization of content items in accordance with one embodiment.

Figure 1:
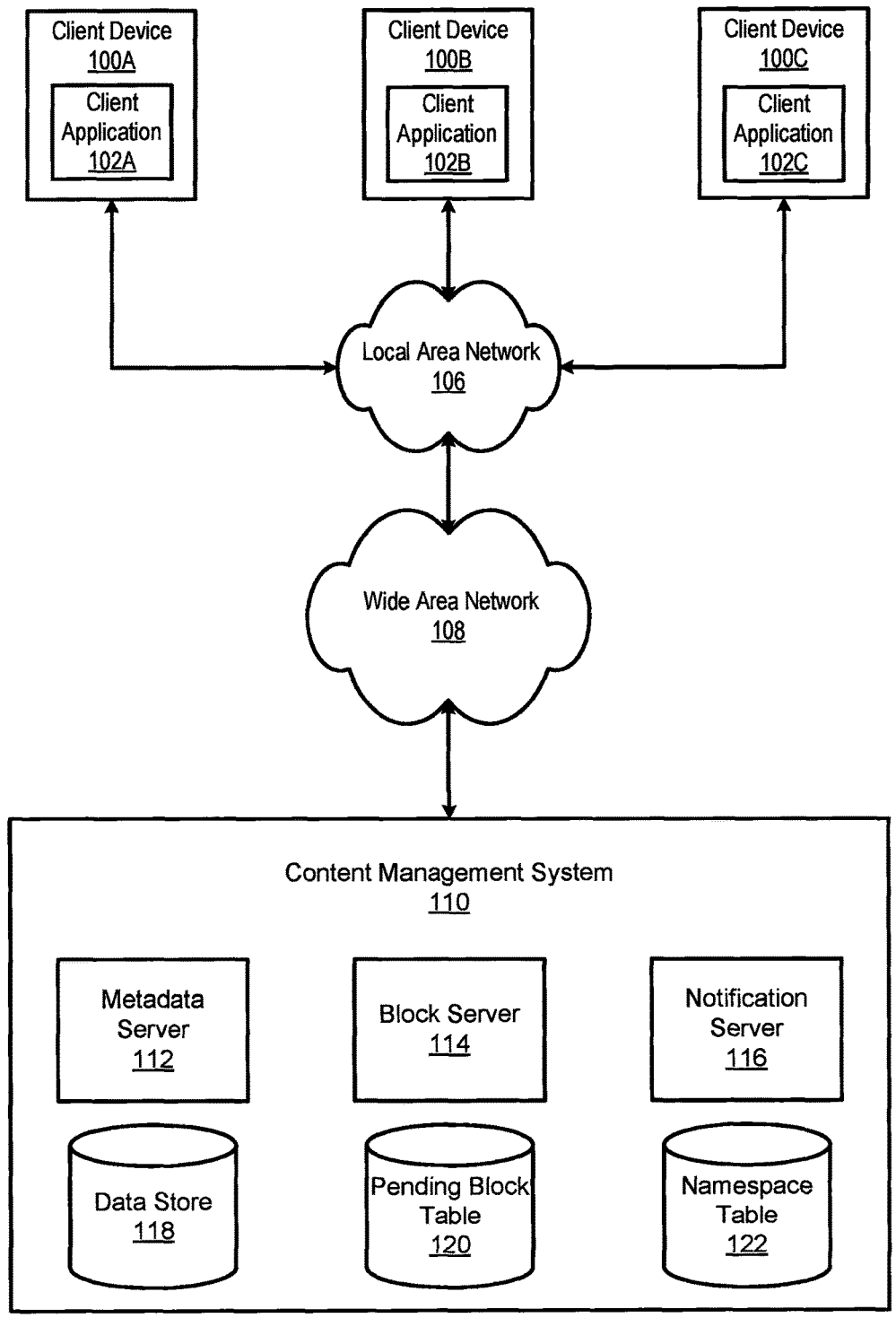
FIG. 1 illustrates a system environment for a content management system that synchronizes content items between client devices on a LAN in accordance with one embodiment.

The figures depict various embodiments for purposes of illustration only. One skilled in the art will readily recognize from the following discussion that alternative embodiments of the structures and methods illustrated herein may be employed without departing from the principles of the invention described herein.

DETAILED DESCRIPTION

Functional Overview of Randomized Peer-to-Peer Synchronization

A general functional overview of a content item synchronization system and process is now described. As a preliminary condition, users store content items on client devices, and the content items are synchronized with instances of the content items on other clients and with a host system, typically a content management system. A client device stores the content items in a local content directory. Content items stored in the local content directory are synchronized with a content management system, which maintains copies of the content items and synchronizes the content items with other client devices. Each client device executes a client application, which enables the user to access the content management system.

In one aspect, client devices synchronized with the content management system my communicate with peer client devices over a local area network (LAN). The client application of a client device communicating on a LAN may utilize the peer client devices to improve the efficiency of downloading content items to a client device in a content management system. Each client device may communicate with a subset of the client devices on the LAN. In some embodiments, the client application on the client device randomly selects the particular subset of client devices on the LAN with which to communicate and from which to receive communications. In other cases, the randomization of the selection is weighted toward client devices with favorable network characteristics or other desirable traits. The client application then receives broadcasts from each of the connected client devices, indicating the set of content items (in the form of a namespace) that are synchronized on the client device.

When the client application on a client device on the LAN is notified by the content management system that a new content item or a new version of an existing content item is available to be synchronized with the client device, the client application determines a set of client devices on the LAN that are synchronized with the same namespace based on the broadcasts received from the connected devices. The client application may then randomly select client devices from the determined set of client devices with a shared namespace to send a request for the new content items. In some embodiments, the client application may perform a weighted randomization towards client devices on the LAN that have favorable current network or performance characteristics.

Upon determining the recipient client devices, the client application sends requests for the new content item to each of the recipient client devices on the LAN. The requests may be sent for individual blocks of an ordered blocklist including the blocks that comprise the new or updated sections of the content item to be synchronized. The blocklist is randomized so that if a content item includes multiple blocks the blocks may be downloaded out of order. If a recipient device contains a synchronized version of the first block in the randomized blocklist, the recipient device transfers a copy of the first block to the requesting device. Once the transfer is complete, the device may make a second request for the second block in the randomized blocklist and so forth until all of the blocks have been transferred. If none of the recipient devices contains a requested block, the requesting client device requests to download the block from the content management system directly. Once the download is complete the requesting client device will continue requesting blocks in the randomized blocklist from the recipient devices.

In some embodiments, each request contains the entire blocklist to be synchronized on the requesting device. In this case, the client application of the recipient device determines whether a synchronized version of each of the blocks in the blocklists exists on the recipient device in the order of the randomized blocklist. Any matching blocks are transferred to the requesting device in the order of the randomized blocklist. Once the transfer is complete an updated blocklist is sent in the next request to the recipient devices.

Overview of System Architecture

FIG. 1 illustrates a system architecture of a content management system according to one embodiment. Details about each component are further described below, however some elements are introduced here to provide context for the explanation of randomized peer-to-peer synchronization. Further, as is apparent to those of skill in the art, the operations and methods used in randomized peer-to-peer synchronization necessarily require a computer, and are not performed in any embodiment by mental steps by a human operator. Further, while the operations may make use of the facilitates of a computer to store and retrieve information, transmit and send information, or process information, those of skill in the art appreciate that such operations are not simply generic computer operations since they are herein performed in specific manners on specifically defined data using the algorithms described herein, and thus require configuration of a computer in a manner different from how such computers are provisioned natively by their operating system and standard applications alone. Additionally, the configuration disclosed herein enables an enhancement to the efficiency with which content items may be downloaded using a peer-to-peer synchronization system.

Client devices 100 communicate with each other using a LAN 106 and communicate with content management system 110 through a wide area network 108, not shown, which can be any suitable communication means providing internetworking between client devices 100 located remotely from content management system 110. In general, client device 100A with a client application 102A installed provides content items to content management system 110. The client application 102A contains the programs and protocols necessary for client device 100A to perform the functions associated with randomized peer-to-peer synchronization. Therefore, client device 100A often performs actions requested by the client application 102A. However because client device 100A and client application 102A act together, for ease of description some of these actions are referred to using "client device 100A" as the operative element. The user of client device 100A has designated certain of the content items to be shared with client device 100B, which for example, can be another computer managed by the same user, or a computer operated by a different user. Content management system 110 notifies client device 100B and synchronizes the designated content items received from client device 100A with local content stored at client device 100B. If client device 100A and client device 100B communicate on the same LAN, client device 100B may request the content items directly from client device 100A using randomized peer-to-peer synchronization as described herein. However, the content management system is typically responsible for notifying client devices that they require synchronization.

Content management system 110 associates each content item with a namespace corresponding to a set of content items. A namespace designates a directory (or "folder") in a directory structure into which the given content items are stored. The association of content items with particular namespaces is stored in a namespace table 122. Content management system 110 associates each client with the namespaces (and content items therein) to which it has access, along with an identification of the specific rights to access, modify, and delete the content items in each namespace. When clients 100 are synchronized to a namespace, the clients store a local copy of content items associated with the namespace and organize the content items according to content location, if available. A user may be associated with an individual client device 100 or with multiple clients 100; for example, a user may have a home computer, a work computer, a portable computer, a smartphone, and tablet computer all synchronized together. To share content items, a user designates a namespace to be shared with other users and/or clients. Content management system 110 then synchronizes the content items in the shared namespace(s) across the clients 100 associated with the shared namespace. The content items stored at content management system 110 can include any type of content item, including documents, data, movies, applications, code, images, music, and so forth. The content item may also be a folder or other mechanism of grouping content items together, such as a collection, playlist, album, file archive, and so forth.

Each user is associated with an account on content management system 110 that includes information specifying an amount of storage to be used for storing content items on content management system 110.

Overview of Content Management System

One method of synchronization using content management system 110 between client devices 100A and 100B can be explained with reference to the architecture illustrated by FIG. 1. The following describes one of a number of possible methods of synchronization that may be used with randomized peer-to-peer synchronization.

Content management system 110 stores content items in data store 118. Content items are stored in fixed size portions termed a block. The size of a block varies according to the implementation, and in one embodiment, the blocks are 4 megabytes in size. Thus, a small content item is stored as a single block, while a large content item may be split up into dozens, hundreds, or more blocks for storage at content management system 110. The metadata includes a blocklist that defines the blocks in the content item and an ordering of the blocks in the content item.

Pending block table 120 maintains a list of pending blocks expected to be received at content management system 110. Pending block table 120 stores an association between blocks being transmitted from clients 100 and namespaces to which those blocks belong.

Namespace table 122 stores data associating individual content items with namespaces and maintains data associating each namespace with clients.

Metadata server 112 is responsible for managing a request from the client to add (commit) a new content item to content management system 110. Metadata server 112 also receives requests to synchronize content items from client device 100. Metadata server 112 maintains a record of the last time that client device 100 synchronized with content management system 110. When a request is received from client device 100 to synchronize, metadata server 112 determines any content items that have been committed to namespaces synchronized to that client device 100 since the last synchronization time stamp. In addition, metadata server 112 determines any pending blocks that have been received since the last synchronization time stamp.

Notification server 116 is responsible for communicating with clients 100, and particularly for notifying clients that new data is available. The notification server 116 maintains a list of clients 110 associated with each namespace at namespace table 122. When the notification server 116 receives an alert from block server 114 or metadata server 112 that a new block is available for a given namespace, notification server 116 identifies clients associated with the namespace from namespace table 112. Notification server 116 notifies client(s) 100 associated with the namespace to wake client(s) 100 and indicates that new blocks are available for the identified namespace.

When client devices are not communicating on the same LAN, synchronization between two clients 100, e.g., client device 100A and client device 100B, occurs as follows. First, client device 100A adds an additional content item to the shared data. The client device 100A notifies the content management system 110 that an additional content item is then is in the shared data. Content management system 110, then notifies client device 100B that the additional content item is in the shared data, and client device 100B prepares to retrieve the additional content item from content management system 110. Content management system 110 maintains a list of content items and pending blocks that are expected to be received at content management system 110 using a pending block table 120, and notifies client device 100B to download blocks corresponding to a content item as blocks are received by content management system 110 from client device 100A. Pending blocks are those blocks that correspond to the additional content item that content management system 110 expects to receive from client device 100A and are used to identify blocks that may be provided to receiving client device 100B prior to the entire additional content item being transmitted to content management system 110.

To manage in-transit content items, content management system 110 retains a list of pending blocks along with the namespace associated with the pending blocks. When a pending block is received, clients associated with the namespace are notified and can initiate a transfer for the received block. Thus, uploading clients (providing a new content item) and downloading clients (receiving the new content item) may asynchronously transfer blocks to content management system 110.

Overview of Client Device

Each client device 100 is a computing device, such as a desktop, laptop, tablet, mobile device, or other system that maintains a local copy of shared data synchronized with content management system 110 and with other clients using the installed client application 102. The shared data may be synchronized only with clients associated with a single user, or may be synchronized to clients associated with multiple users. Client device 100 includes modules and applications for manipulating and adding data to the shared data, as further described with respect to FIG. 2.

Figure 2:
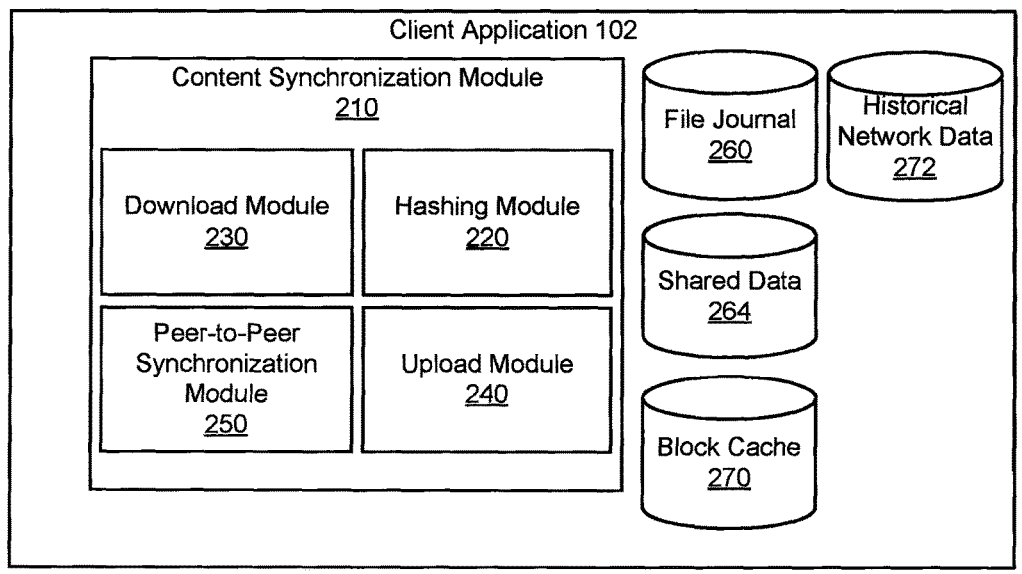
FIG. 2 illustrates the software architecture of a client device in accordance with one embodiment.

FIG. 2 shows modules of client application 102. Client application 102 includes various modules and data stores for synchronizing data with content management system 110. Client application 102 includes content synchronization module 210, hashing module 220, download module 230, upload module 240, and peer-to-peer synchronization module 250. Additionally, the client application 102 maintains data stores including a file journal 260, shared data 264, a block cache 270, and historical network data 272.

Shared data 264 are data that has been synchronized with content management system 110, and includes content items received from content management system 110. When users add, modify, or delete content items in shared data 264, those changes are synchronized with content management system 110. The hashing module 220 and the block cache 270 work to identify blocks that comprise content items being uploaded to content management system 110. The hashing module 220 assigns a block identifier by performing any suitable hashing algorithm, such as MD5 or SHA-1. Content synchronization module 210 then uses these identifiers to compare the resident blocks located in the block cache 270 with the blocks maintained by content management system 110.

Within the client application 102, the file journal 260 stores a table listing metadata for all content items accessible to the account using the client application 102. Metadata includes revision date and time, namespace, and blocklists corresponding to each content item. Content items that are not resident or not synchronized are still included in the file journal 260.

When data is modified or added to the shared data 264 on the client device 100 within the client application 102, the modifications to the shared data 264 are transmitted to content management system 110 by upload module 240. The uploaded data includes the relevant block identifier for the modified or added blocks. The content management module 110 then notifies other client devices that have the same namespace as the uploading client device 100 that new blocks, or new versions of blocks, have been uploaded. The notification may include the block identifiers and the corresponding content items to be updated. When the client device 100 receives a notification, client device 100 queries content management system 110 for modifications to shared data 264. When the shared data is modified, the content synchronization module 210 requests the modifications from content management system 110 to store shared data on client device 100. The request may be a single request that includes a s for the new or updated content items or multiple request may be sent each including a single block for download to the client device 100. Download module 230 then receives any blocks downloaded from the content management system 110 by updating the file journal 260, shared data 264, and the block cache 270, to reflect the new versions of the downloaded blocks.

Peer-to-peer Synchronization

The peer-to-peer synchronization module 250 utilizes an additional process to synchronize content items using peer devices. For clarification, peer devices may be any client devices connected to the same LAN. The peer-to-peer synchronization module 250 may identify whether the client device 100 is connected to a LAN. Upon determining that the client device is connected to a LAN the peer-to-peer synchronization module 250 institutes an alternative method for synchronizing content items, which is described with reference to FIGS. 3-7.

After determining that the client device 100 is connected to a LAN, the peer-to-peer synchronization module 250 identifies peer devices communicating on the local area network that are associated with the same namespace as the client device 100. The peer-to-peer synchronization module 250 receives broadcasts from peer devices on the LAN that have the client application installed. Broadcasts are typically sent over the LAN using the user datagram protocol (UDP). Client devices 100 communicating on a LAN send UDP messages to any device connected to the LAN. The peer-to-peer synchronization module 250 parses each broadcast to determine the IP address of the peer device sending the broadcasts as well as the namespace synchronized on that peer device. The peer-to-peer synchronization module 250 then compares the namespace of each broadcast with the namespace synchronized on the client device 100. If the namespaces match, the peer-to-peer synchronization module 250 stores the IP address of the peer device with the matching namespace in order to connect to those devices later.

Figure 3A:
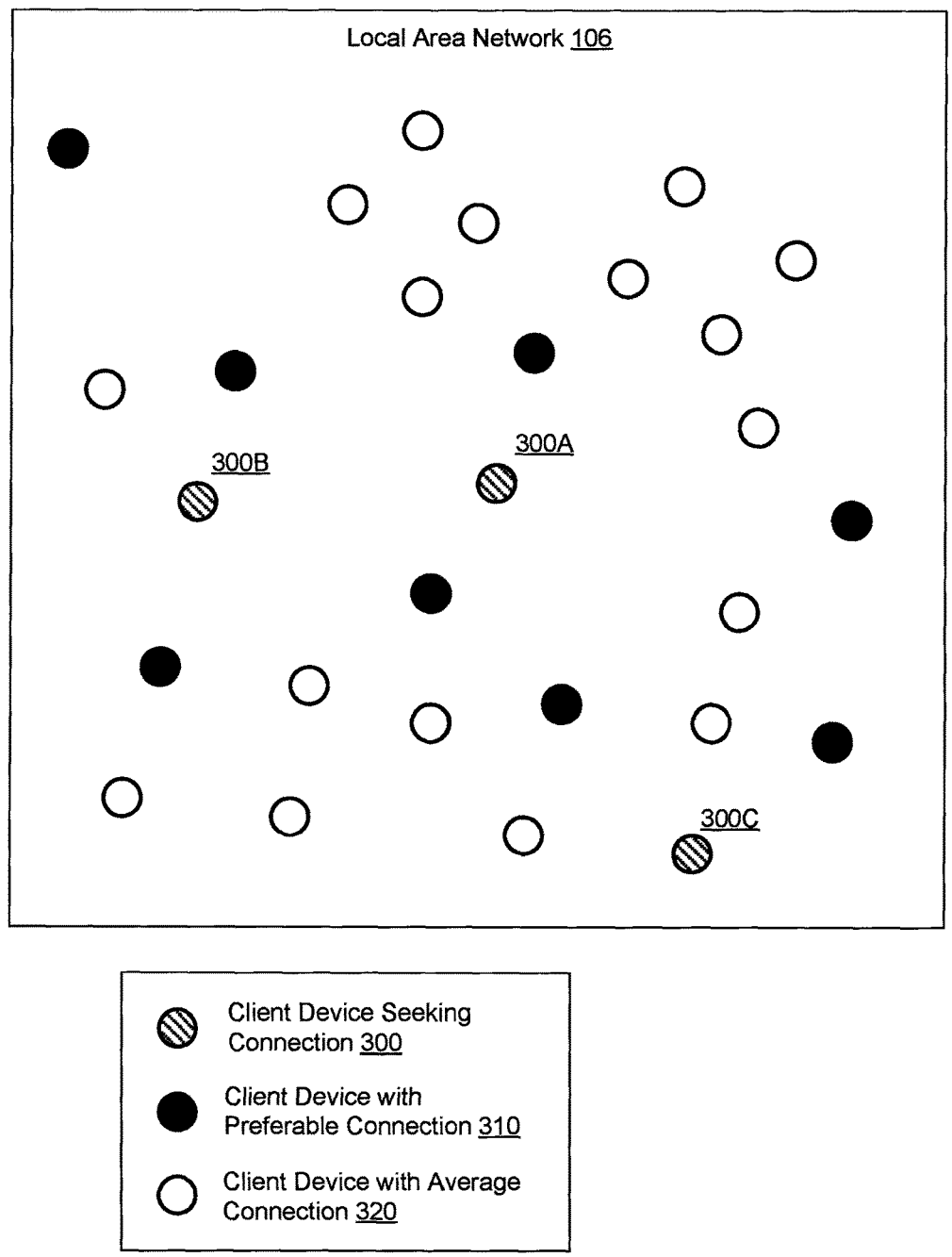
FIG. 3A-3E are conceptual illustrations of client devices on a LAN maintaining connections with each other comparing a prior art method with various embodiments.

FIG. 3A is a conceptual illustration of a typical group of peer devices with matching namespaces communicating on local area network 106. Striped circles represent peer devices that have recently joined the LAN network and are seeking a connections. Black circles represent peer devices with preferable connections, such as having a low ping or a high bandwidth or any other preferable network characteristic. White circles represent peer devices with average or unremarkable network characteristics.

The peer-to-peer synchronization module 250 connects to a group of the peer devices in order to receive and send communications regarding the content management system 110 and the matching namespace. The client device 100 may connect to a subset of the peer devices on a LAN that share a namespace. The number of peer devices with which the client device 100 maintains a connection may be based on the network of the particular client device 100. Alternatively, the number of peer devices in the subset of peer devices may be proportional to the total number of devices connected to the LAN or the total number of devices that share the namespace of the client device 100 at the discretion of the implmenter. In another embodiment, the number of peer devices in the connected subset of peer devices may be preset for the content management system 110 at the discretion of the implementer. A client device 100 may maintain connections with all of the devices that share a namespace on the LAN if there are fewer peer devices that share the namespace than the determined number of peer devices for the subset of peer devices. In addition, the number of connections for each client device may be based on the average, median, or mode number of blocks for content items on the namespace. For example the number of connections for each client device 100 may be set to three times the number of average blocks in the namespace. This allows three opportunities to request a block before sending a request to the content management system 110.

The client device 100 connects to a subset of the total number of peer devices sharing a namespace with the client device 100 because connecting to too many peer devices may decrease network performance for the devices. Additionally, the subset of peer devices is typically representative of the majority of the content items stored on a given namespace that are present on the LAN, if the size of the subset group is large, is an appreciable portion of the number of peer devices that share the namespace, and is chosen using an acceptable algorithm, such as those described below.

Connections are established using the transmission control protocol (TCP) or the stream transmission control protocol (STCP). This sets up a secure and reliable connection with which to exchange shared data and metadata and offers better user experience by allowing for synchronization of content items as quickly as possible.

In standard peer-to-peer systems each device favors a connection with peer devices that have the most favorable current or historic network performance. However, this can result in new devices forming connections with peer devices that are already connected to many other devices. The process of synchronizing content items across peer devices with the same namespace may result in bursts of network activity during synchronization; thus, if too many devices form connections with the preferable devices 310, then network traffic can become problematic. This idea is illustrated by FIGS. 3B and 3C.

Figure 3B:
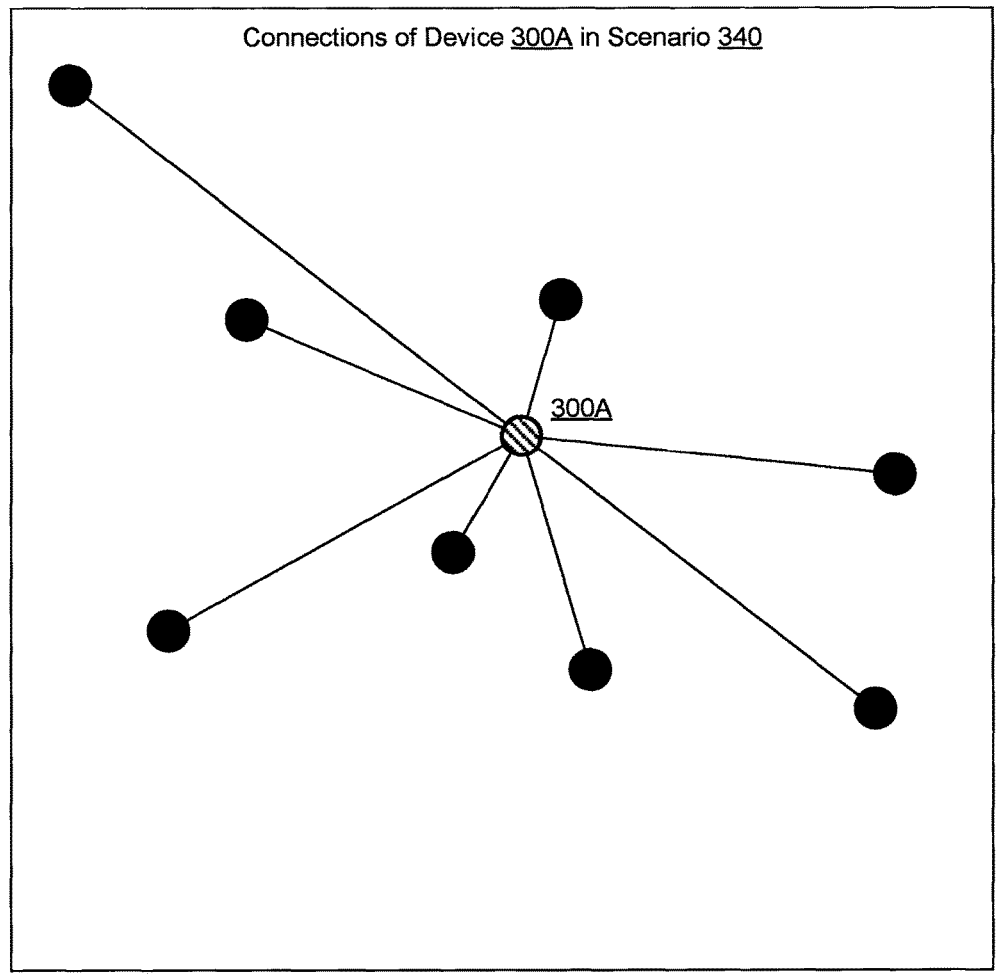
Figure 3B:
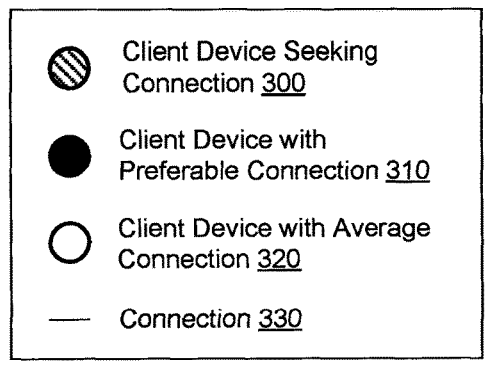
Figure 3C:
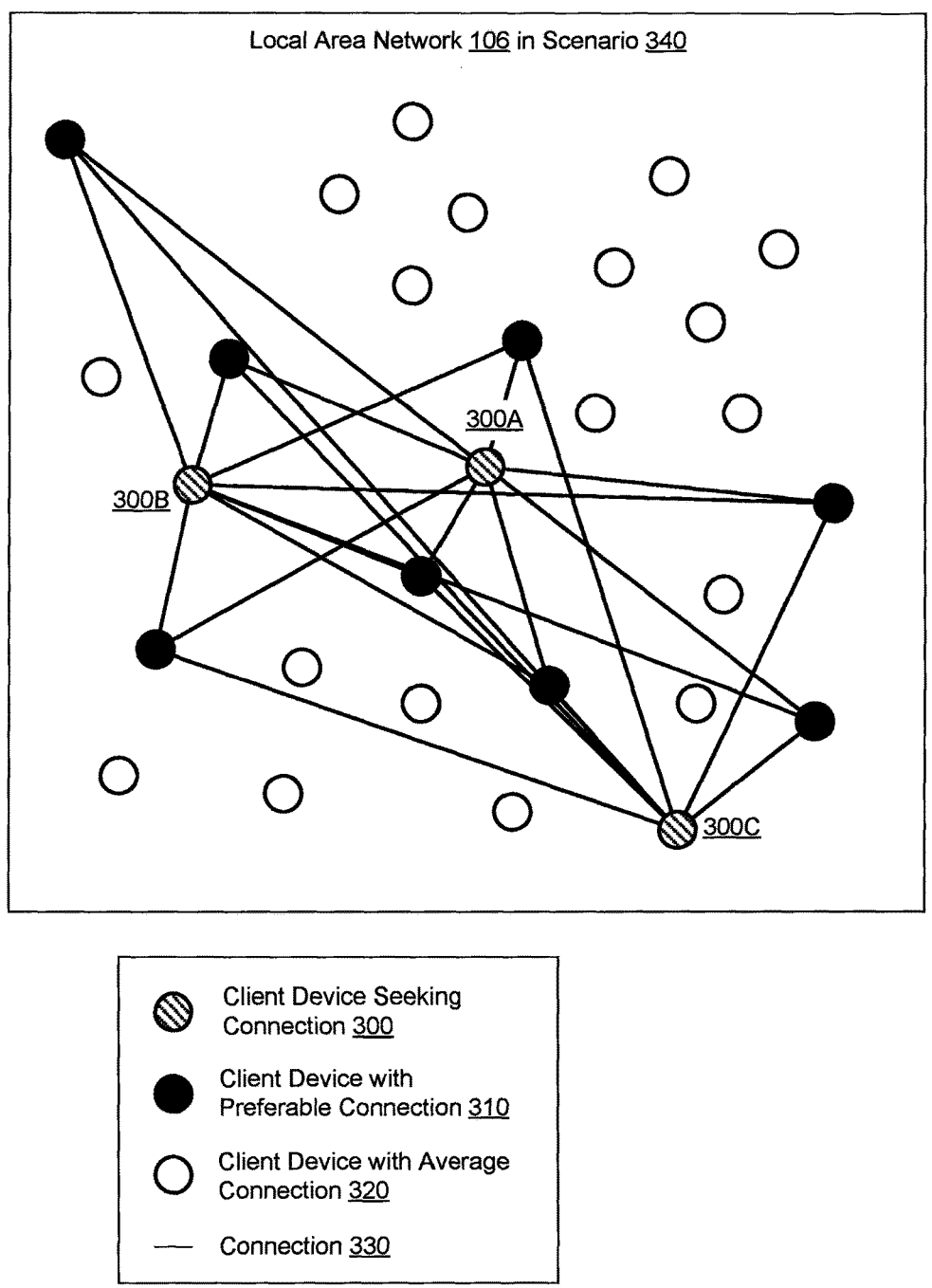

FIG. 3B illustrates the connections of device 300A. Device 300A joins the LAN and receives broadcasts from a number of namespace sharing peer devices. In this scenario 340, the device 300A forms connections based primarily on positive network characteristics. For the purposes of illustration, assume that the number of connections that the device 300A may make is limited to eight connections.

In scenario 340, device 300A initiates connections only with the eight preferable peer devices 310. Devices 300B and 300C follow the same regime and connect to the same eight devices 310. FIG. 3C illustrates the result of scenario 340. Devices 300A, 300B, and 300C are all connected to the same eight preferable devices 310. Although these devices have superior network characteristics to the average peer device 320 during typical network activity based on the historical network characteristics they may in fact perform worse if each of devices 300A, 300B, and 300C submits content item requests at the same time. Performance might be improved by better distributing the load between the preferable devices 310 and the average devices 320.

In one embodiment, the peer-to-peer synchronization module 250 requests connections from a randomly selected subset of peer devices that share a namespace with the client device 100. This ensures that no peer devices are favored over others and is the most likely to result in an even distribution of connections across devices that share a namespace. Thus, during synchronization network traffic is unlikely to be inhibitive. On the other hand, devices with preferable connections 310 are poorly utilized as they are typically more able to handle multiple connections.

In another embodiment, the peer-to-peer synchronization module 250 uses a weighted randomization scheme to determine the peer devices with which to connect. In this case, preferable devices are given priority based on factors such as historical average bandwidth, historical average latency, connection success rate, historical broadcast frequency, historical average connection speed, or any other suitable measure. In some cases, devices may receive a score indicating their overall favorability based on historical network characteristics 272. The score may then be modified by a random integer normally distributed about zero. The standard deviation of the normal distribution may be adjusted as a design choice. Alternatively, any other distributions may be used to achieve a similar purpose. In some embodiments, the parameters of the distribution (such as the standard deviation in the case of a normal standard deviation) may be modified based on the original ranking of a peer device. For example, randomized values based on a distribution with a higher standard deviation may be added to the scores of the higher ranked devices while distributions with less variance might be used for lower ranked peer devices. Adding a random integer to the ranking prevents all client devices 100 from determining an identical ranking and prioritizing the same peer devices 310. But, simultaneously, it is more likely that the more suitable peer devices 310 receive a higher score and thus they are more likely to be selected for a connection. A person of skill in the art will appreciate that other methods of weighted randomization and ranking may be used to achieve a similar result. For example, each peer device may be given a score that places the peer device in a "bin," and then the devices in each bin may be randomized within that bin but without moving to a different bin. When connecting, the client device 100 would select devices from the first few bins.

Figure 3D:
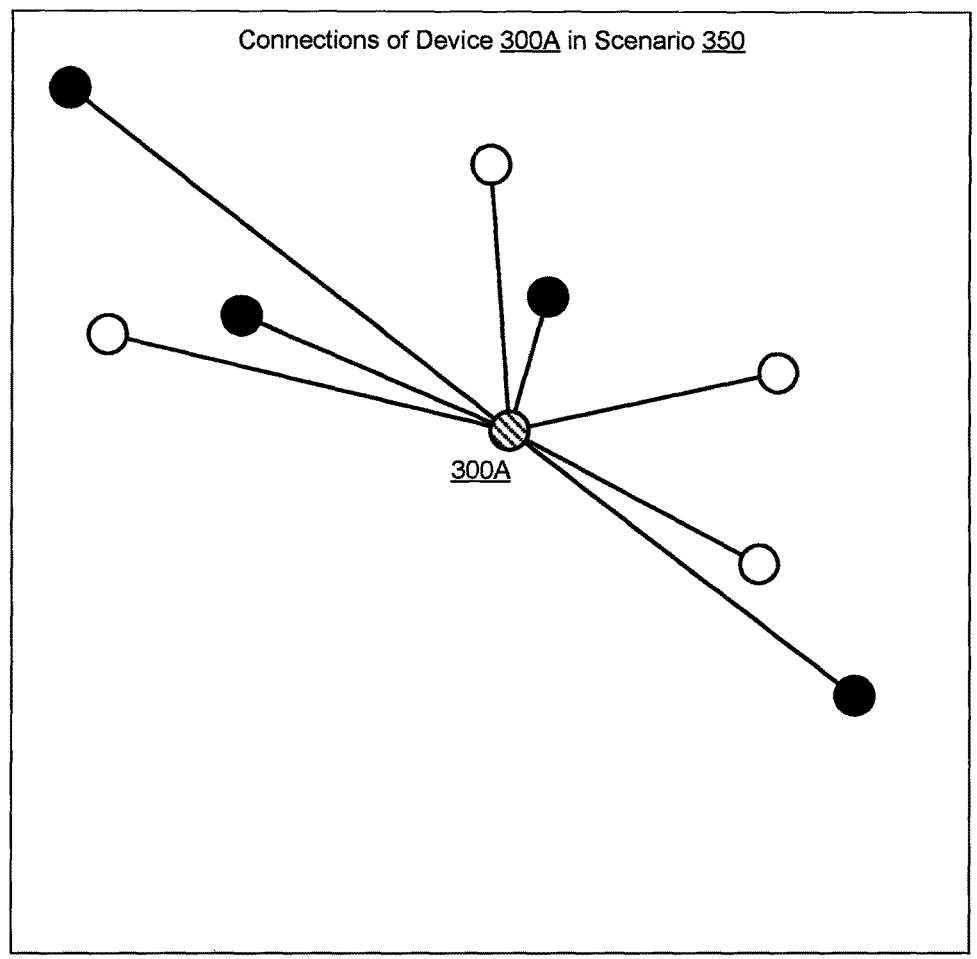
Figure 3E:
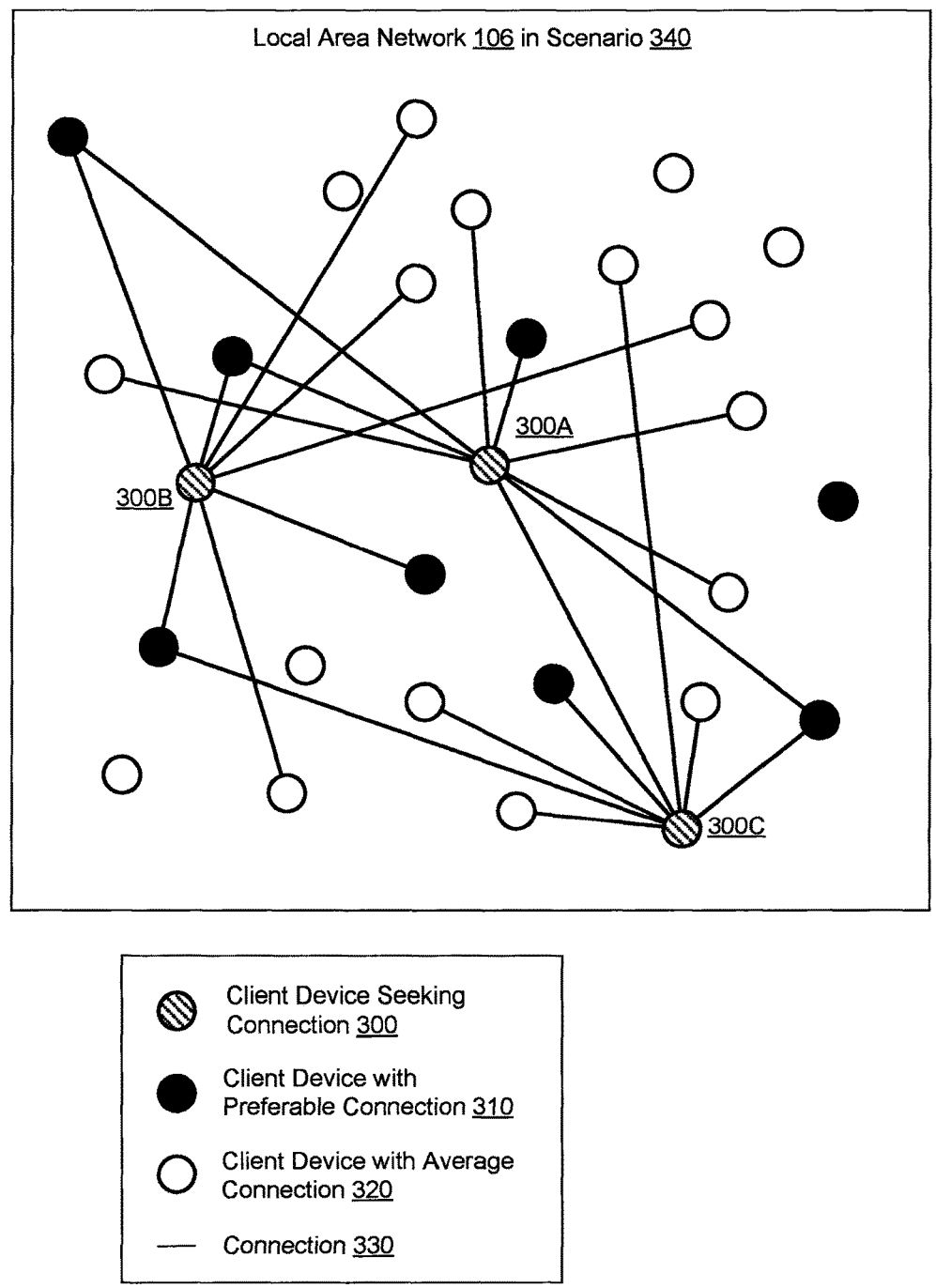

FIG. 3D illustrates a scenario for weighted randomized connections. In this scenario 350, device 300A once again connects to eight devices. However, in scenario 350, weighted randomization is used. Thus, device 300A connects to a weighted split between the preferable devices 310 and the average devices 320. In addition, because of the randomization, devices 300B and 300C select a different subset of devices with which to connect. FIG. 3E illustrates the result of devices 300A, 300B, and 300C connecting in scenario 350. The connections 330 in this example are much more distributed amongst all of the peer devices that share a namespace. Thus, when synchronization of a newly added content item occurs request traffic will be more evenly distributed resulting in better performance than the prior art.

Once the client device 100 has initiated a connection with the selected subset of peer devices sharing a namespace with the client device 100, the client device is prepared to send block requests to the connected subset of peer devices. In peer-to-peer synchronization, when the client device 100 receives a notification that blocks have been added or modified in the namespace synchronized with the client device 100, the peer-to-peer synchronization module 250 first sends requests to the connected peer devices before sending a request to the content management system 110. This requesting strategy may reduce synchronization time and improve overall system performance. This is because when a peer device is able to fulfill a request, no request is made to the content management system, thereby reducing traffic at the server level. Additionally, since connection times between devices on the same network are much shorter than initiating a connection with the server, this enables shorter download times. Also, peer-to-peer requests reduce redundancy from the server perspective by allowing a few seed peer devices to spread data received from the content management system 110 with other devices on the LAN.

Once a TCP connection is established between two peer devices, the peer-to-peer synchronization module 250 uses HTTP requests to request particular blocks from the connected peer device or an entire blocklist for a content item. The peer-to-peer synchronization module 250 may notify a connected device of the ID of the requested content item. These notifications may better coordinate future requests from peer devices.

In a typical peer-to-peer synchronization, first requests are usually sent to the first available connected peer device. However, when multiple peer devices are attempting to download a new content item at the same time this strategy often results in multiple peer devices requesting a single device for the same blocks if that peer device has a low latency connection to a number of other devices. This can lead to reduced performance by increasing traffic around a single device and, in some cases, causing the device to have to repeatedly deny requests for the same content item.

Figure 4A:
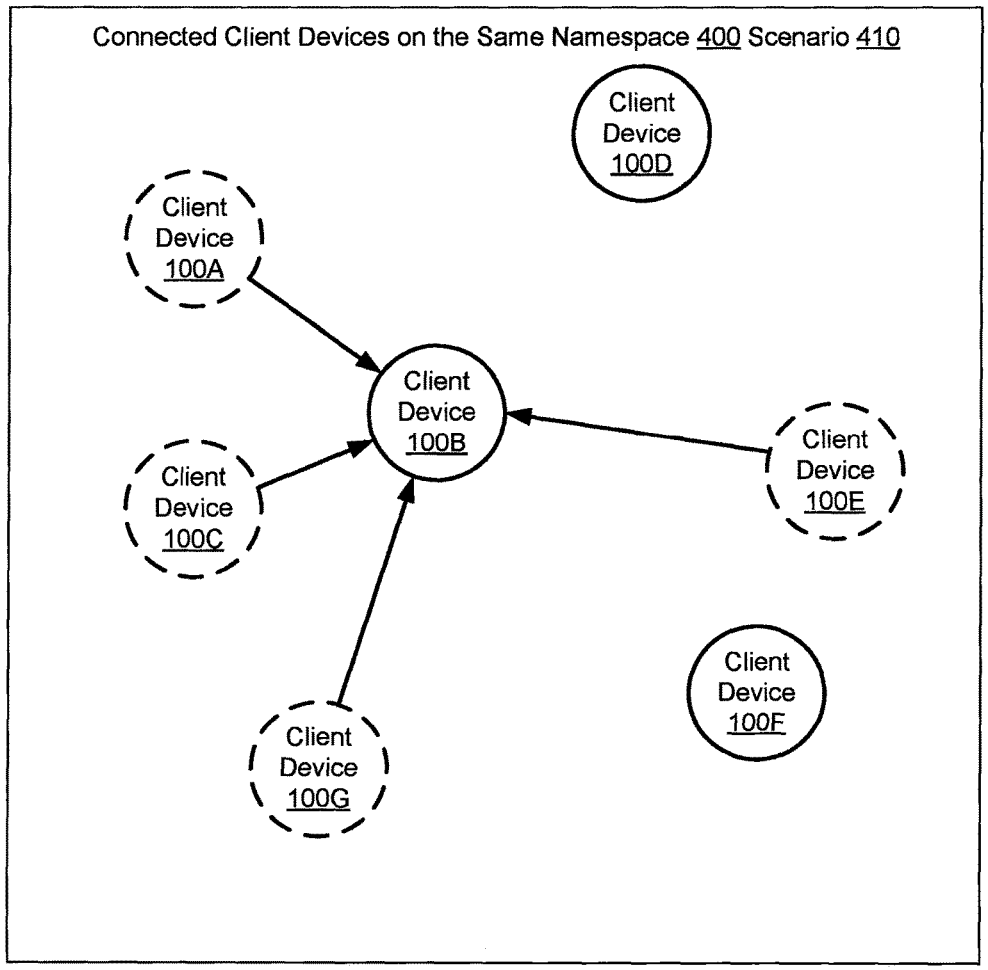
FIG. 4A-4B are conceptual illustrations of client devices requesting content items from other client devices on a LAN other comparing a prior art method with one embodiment.
Figure 4B:
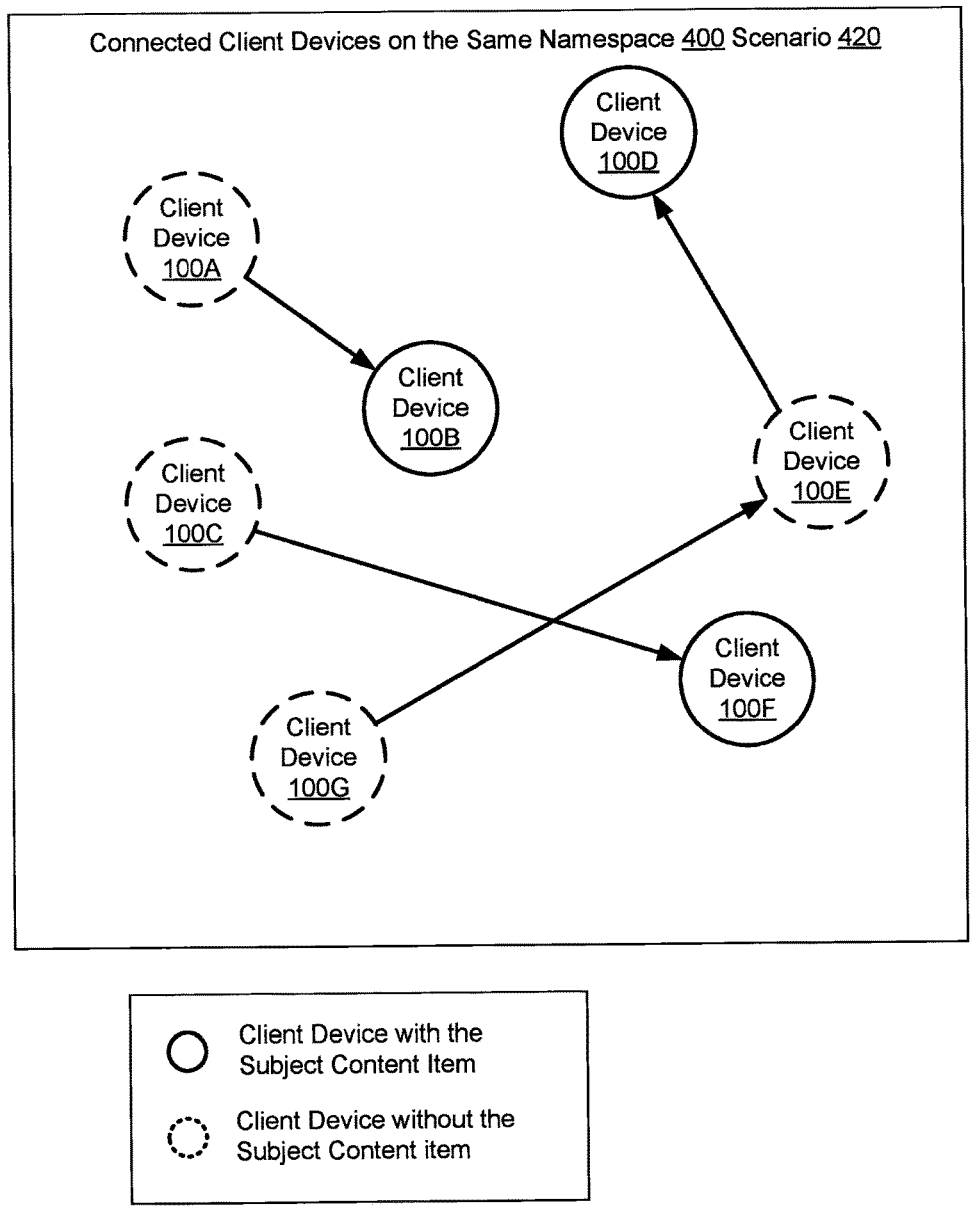

To improve upon this aspect of performance, the peer-to-peer synchronization module 250 randomizes the order of connected devices to which requests are sent. FIG. 4A illustrates a case wherein a number of client devices 100A, 100C, 100E, and 100G all request a subject content item from client device 100B first due to its low latency. Because client device 100B has the content item, it accepts each of the requests in order but has to serve each of those requests consecutively thereby slowing performance. FIG. 4B illustrates an alternative method of ordering requests. Instead of sending a request to a peer device with the best connection by some metric or sending out requests simultaneously and using the first responding device to download the content item, the peer-to-peer synchronization module 250 may randomly determine a request order for a client devices 100 connected peer devices. As illustrated in FIG. 4B, the initial requests are more evenly distributed across the peer devices in scenario 420. This improves performance both by reducing the amount of traffic around a single client device and by decreasing the chance of multiple requesting client devices 100 sending a request to a peer device that does not have the requested blocks.

In addition to simply randomizing the request order, the peer-to-peer synchronization module 250 may use a weighted randomization method to determine the request order for client devices. In this case, the peer-to-peer synchronization module 250 calculates a score for each connected peer device and then applies a randomized modifier based on a distribution as described with reference to FIGS. 3D and 3E. In this case, the score of each connected peer device may be based off of the devices current network characteristics including the current bandwidth of the device, how many requests the device has received within a period of time, how many namespaces are synchronized on the device, whether the device is currently communicating with the content management system 110 over a wide area network, current latency, or any other suitable network characteristic.

In addition to being used to determine the request order, the score of the connected peer client devices can also be used to determine whether each connection with the peer devices should be terminated or maintained. In some embodiments, if the connected peer device score is below a threshold, the connection with that device is terminated and a new connection is made with another peer device.

As previously described, each request to a connected peer device may include a request for a single block comprising a content item or it may include an entire blocklist for a content item. In either case, the peer-to-peer synchronization module 250 randomizes the order of the individual block requests or the order of the blocklist to improve performance. In other embodiments, some blocks comprising the content item are maintained in their original order to allow an application on the client device 100 to open the content item before the download is completed.

FIGS. 5A-5D and illustrate a peer-to-peer synchronization system that does not randomize the blocklist in a situation where client devices 100A, 100B, and 100C have been notified by the content management system that a new content item comprised of blocks 1-5 has been added to the common namespace of the client devices 100. To simplify the scenario depicted in FIG. 5 only three client devices are shown, however it is clear how the problems and solutions demonstrated in this case are extensible to large number of content items.

Figure 5A:
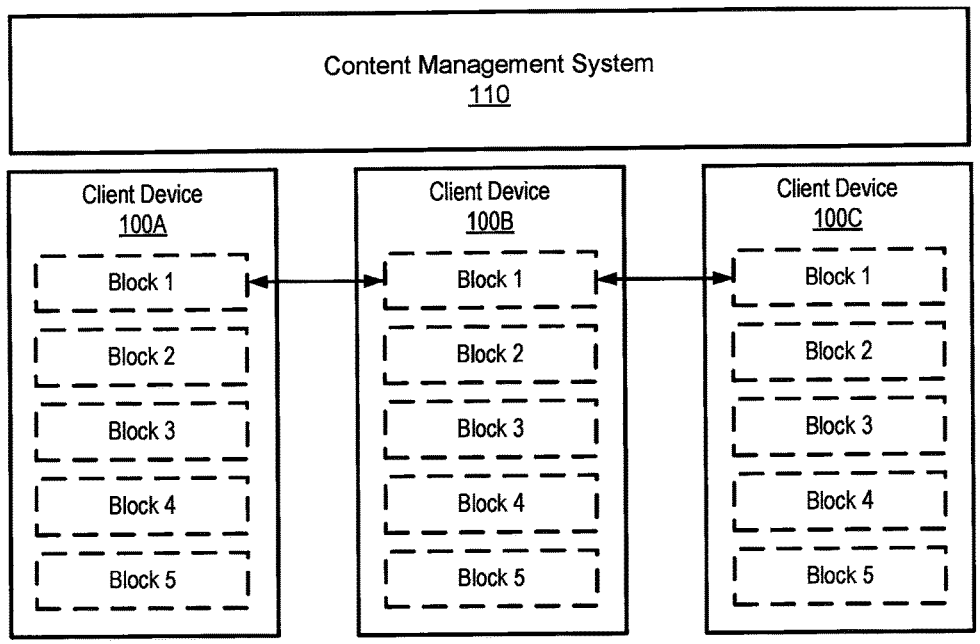
FIG. 5A-5D are conceptual illustrations of a typical block requesting scenario.

FIG. 5A begins when none of the client devices 100 are storing any of the blocks 1-5. This triggers the peer-to-peer synchronization module 250 on each client device to request the first block on the blocklist from each of the other two client devices 100 (the two requests from each client device 100 do not occur at the same time but since the difference in the request time is significantly longer than the download time for a block the two requests can be treated as if they happen simultaneously). Clearly none of the client devices have block 1 so all the requests are denied.

Figure 5B:
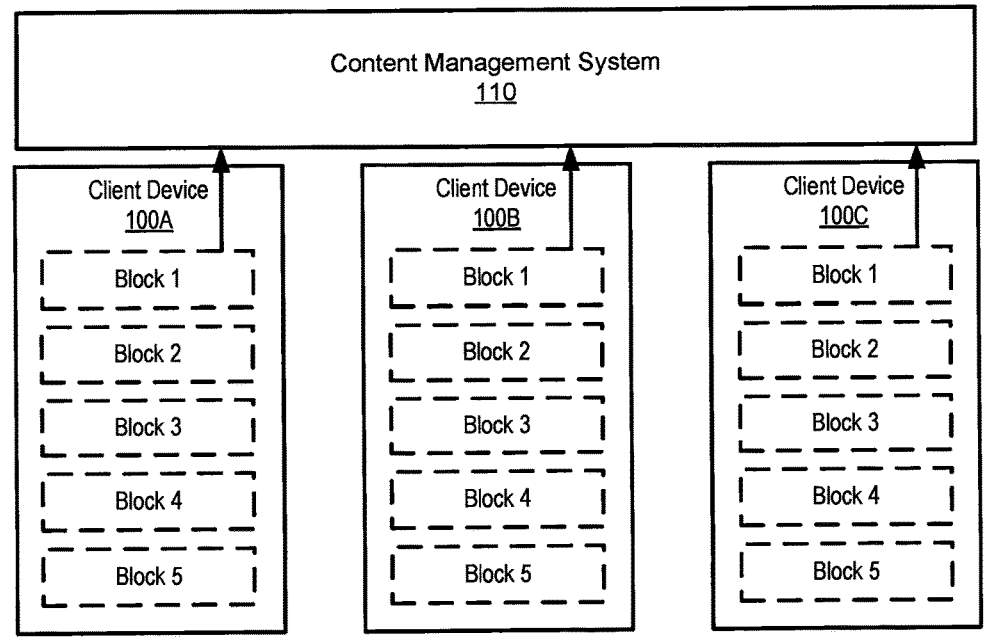

FIG. 5B illustrates that, having failed to locate block 1 on any of the two peer devices, the client devices 100 request the first block from the content management system 110.

Figure 5C:
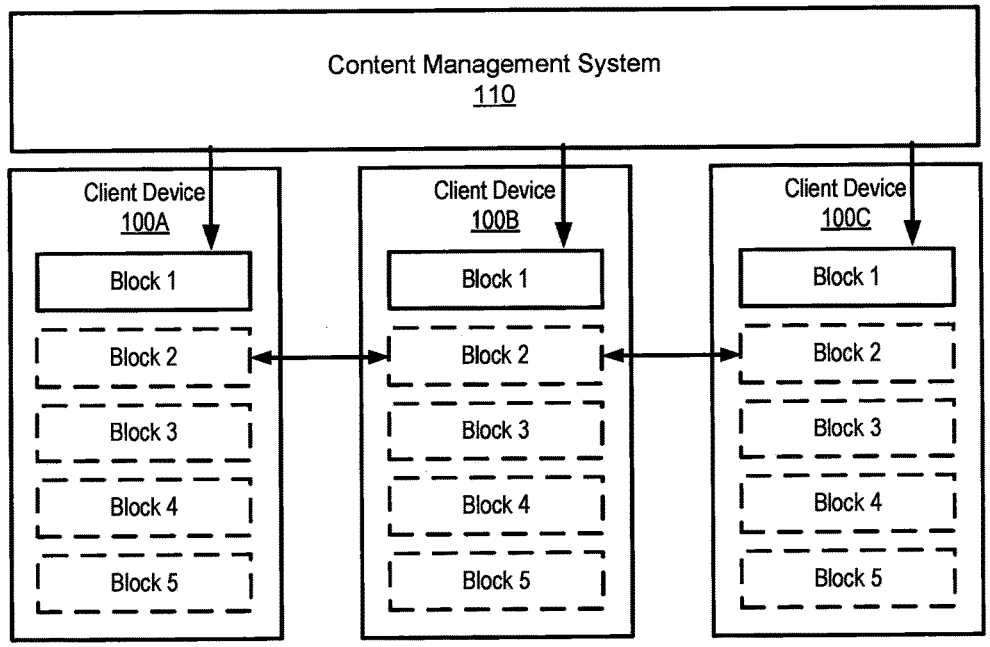

FIG. 5C is a repetition of the first step, after downloading of the first block is complete the peer-to-peer synchronization module 250 on each client device 100 requests block 2 from each of the other peer devices. Because each of the client devices has the same blocklist order none of the other client devices have downloaded block 2.

Figure 5D:
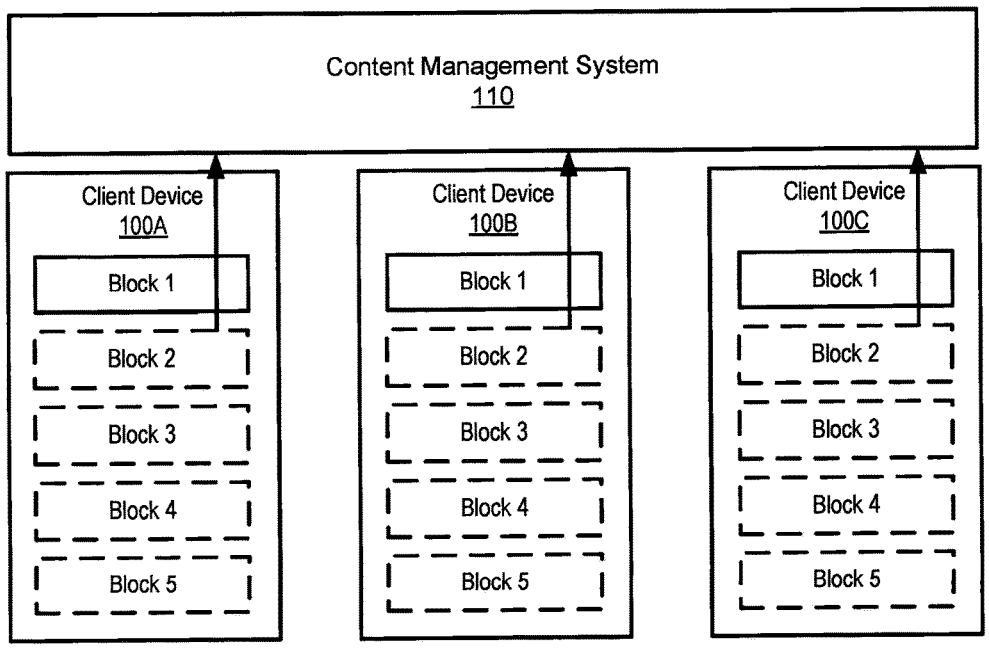

FIG. 5D illustrates that all three client devices must request the second block from the content management system as none were able to receive the second block from a peer device.

Figure 6A:
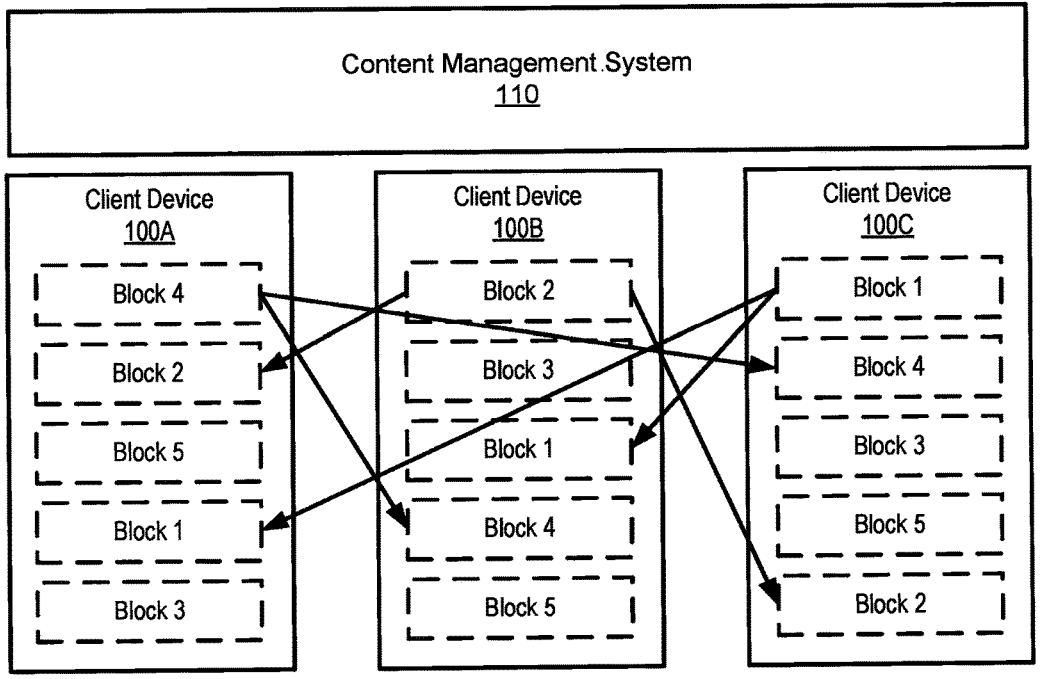
FIG. 6A-6D are conceptual illustrations of a block requesting method in accordance with one embodiment.
Figure 6B:
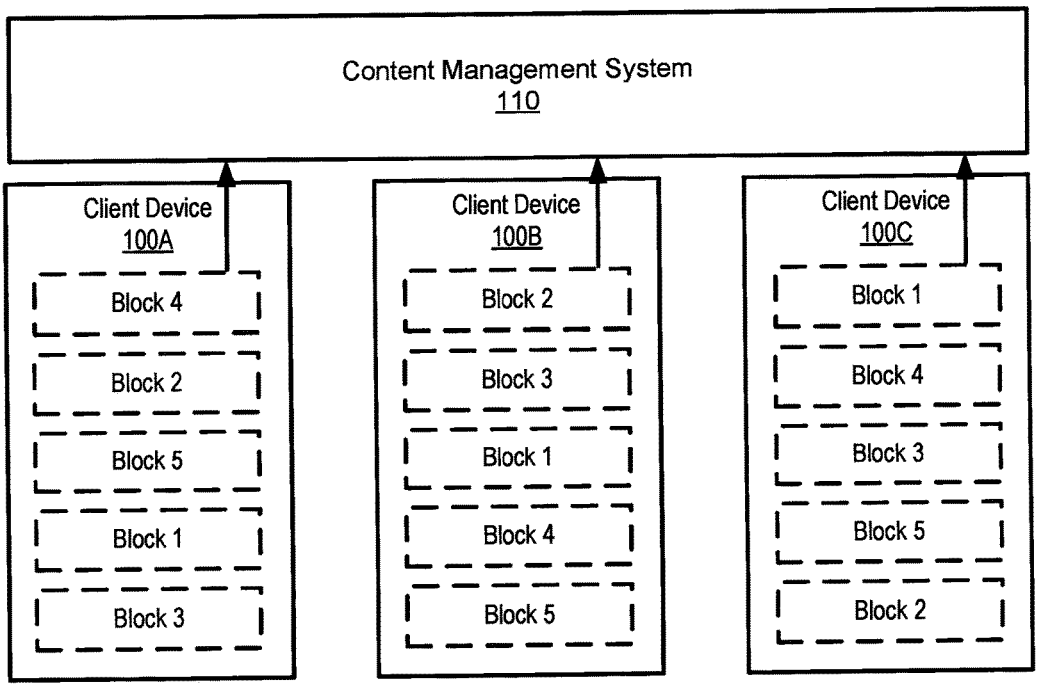

FIGS. 6A-6D show a similar scenario to FIGS. 5A-5D but instead the blocklist is randomized. FIG. 6A illustrates the first step when none of the client devices have any of the blocks. This unfolds much the same way and all three client devices must request the first requested block from the content management system 110 as shown in FIG. 6B.

Figure 6C:
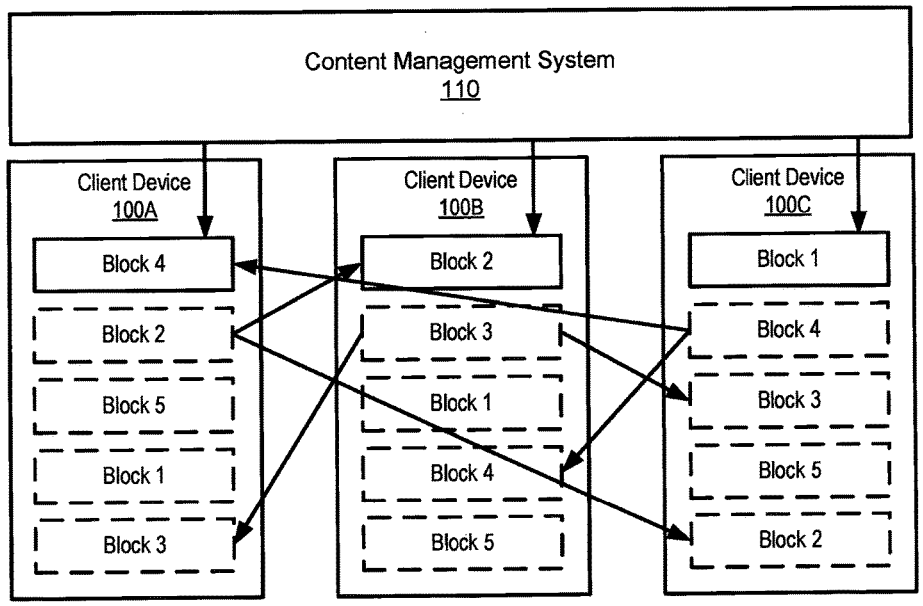
Figure 6D:
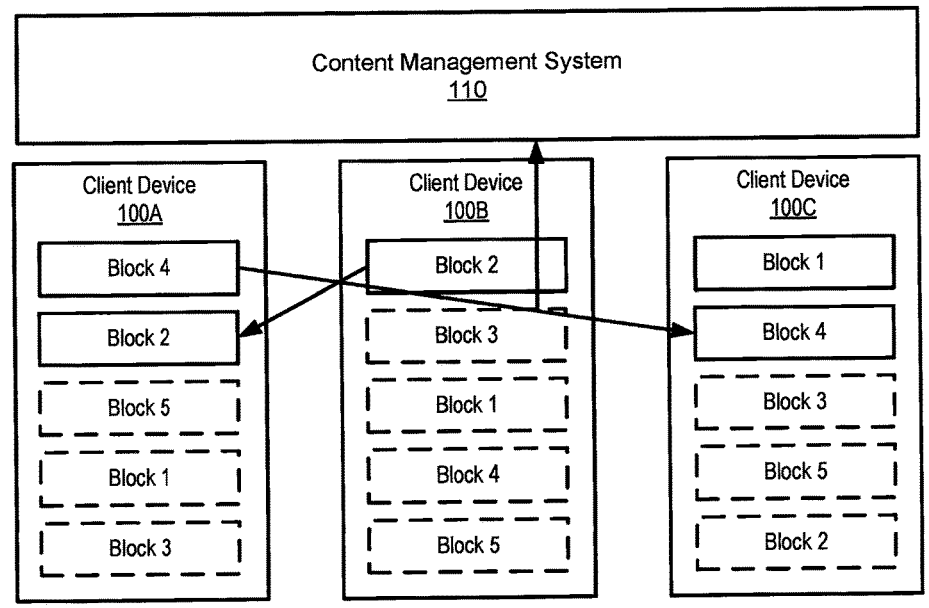

In FIG. 6C, client device 100A downloads block 4, client device 100B downloads block 2, and client device 100C downloads block 1 from the content management system 110. The peer-to-peer synchronization module 250 for each client device then continue to the next block in the blocklist. For client device 100A block 2 is the second block in the blocklist and because client device 100B has already downloaded block 2 from the content management system 110 the request is successful. Block 2 is transferred to client device 100A from client device 100B thereby preventing a request to the content management system and providing a faster download than what would have been provided by a server of a WAN. Likewise client device 100C is also able to receive a more efficient peer-to-peer transfer for block 4. Unfortunately client device 100B does not find a source for block 3 which is second in its blocklist. FIG. 6D Shows the result of the randomized blocklist. By ensuring that all blocklists are ordered differently from each other, the efficiency of the peer-to-peer synchronization system improves because client devices 100 are more likely to have successful requests with peer devices in the same network. This is especially useful in situations where many devices are requesting a content item at the same time or when one device recently joins a namespace on the LAN.

FIG. 7 is a flow diagram of a method of randomized peer-to-peer synchronization of content items in accordance with one embodiment. First, a client device 100 stores 700 one or more synchronized content items associated with a namespace. Then the peer-to-peer synchronization module 250 determines that the client device 100 is communicating on a LAN. The peer-to-peer synchronization module 250 receives 710 a plurality of broadcasts from other client devices on the LAN that have the client application 102 installed. The peer-to-peer synchronization module 250 of the client devices then identifies the broadcasting client devices that are associated with the same namespace as the client device 100. The peer-to-peer synchronization module 250 then selects a randomized subset of the identified client devices that share a namespace with the first client device 100 and connects 720 with each of the selected client devices. In some embodiments, the randomization is weighted toward devices with favorable historical network characteristics. Next, upon receiving 730 a notification from the content management system 110 that a new content item is synchronized with the namespace, the peer-to-peer synchronization module 250 sends 740 a request to a subset of the connected devices. In some embodiments, each request is a request for a single block of the content item. In other embodiments, the request comprises the entire blocklist. Each request may be sent to each of the subset of connected devices in a randomized order. The randomized order may be weighted towards sending requests to connected devices that have favorable current network characteristics. The order in which blocks (or the blocks in the blocklist) are requested is also randomized. In some embodiments, some blocks remain in their original position to allow applications to open the content item before all blocks have been stored on the client device 100. Responsive to determining that none of the subset of connected devices have a synchronized version of the requested block (or does not have all of the requested blocks in the blocklist) downloading 760 the first requested block from the content management system 110 (or download the unavailable blocks in the blocklist from the content management system 110). If requests are for individual blocks, the second block in the blocklist is then sent to the subset of connected client devices. In the case that one of the subset of connected client devices has the first block (or some of the blocks in the blocklist), the client device downloads 770 the first block (or the matching blocks in the blocklist) to the client device 100 before sending a request for a second block (or a new blocklist for a different content item).

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A non-transitory computer-readable storage medium storing instructions that, when executed by a first client device of a plurality of client devices communicating with a local area network (LAN) and communicating with a content management system that is on a network other than the LAN, cause the first client device to perform operations comprising:

receiving, from the content management system, a synchronization notification indicating that the first client device is to synchronize a content item, wherein the content item comprises a plurality of blocks, the synchronizing comprising:

requesting from the plurality of client devices communicating on the LAN a first block in a randomized blocklist, the randomized blocklist specifying a random order of the plurality of blocks;

in response to determining from the request that a second device of the plurality of client devices has a copy of the requested first block identified in the randomized blocklist, downloading the first block from the second client device; and in response to determining from the request that none of the plurality of client devices has a copy of the requested first block, downloading the requested first block from the content management system.

2. The non-transitory computer-readable storage medium of claim 1, the operations further comprising, in response to receiving from a third device of the plurality of client devices a request for the first block, sending the first block to the third device, the third device including a second randomized blocklist specifying a second random order of the plurality of blocks and configured to request the first block in response to downloading blocks preceding the first block within the second randomized blocklist.

3. The non-transitory computer-readable storage medium of claim 1, wherein the content item and the first client device are associated with a same namespace.

4. The non-transitory computer-readable storage medium of claim 1, wherein requesting from the plurality of client devices communicating on the LAN a first block in the blocklist comprises:

receiving broadcasts from the one or more client devices communicating on the LAN, each broadcast identifying one or more namespaces associated with the broadcasting client device; and identifying from the received broadcasts, a group of one or more broadcasting client devices broadcasting a namespace associated with the first client device.

5. The non-transitory computer-readable storage medium of claim 1, wherein synchronizing further comprises:

in response to determining that a third client device from the one or more client devices also communicating on the LAN has a copy of a second block identified in the blocklist, downloading the second block from the third client device.

6. The non-transitory computer-readable storage medium of claim 1, wherein determining that the second client device from one or more client devices also communicating on the LAN has a copy of the first block identified in the blocklist and downloading the first block from the second client device, further comprises:

sending a request to the second client device, the request including the randomized blocklist; and downloading blocks from the randomized blocklist that are stored on the second client device in the order of the randomized blocklist.

7. The non-transitory computer-readable storage medium of claim 1, wherein the first client device performs operations further comprising:

selecting the second client device from the one or more client devices communicating on the LAN based on network characteristics of the LAN; and sending a request to the second client device, the request requesting the first block.

8. The non-transitory computer-readable storage medium of claim 1, wherein the request for the first block includes the randomized blocklist.

9. The non-transitory computer-readable storage medium of claim 1, wherein the randomized blocklist is generated by the content management system.

10. A method for comprising:

receiving at a first client device of a plurality of client devices a synchronization notification from a content management system, indicating that the first client device is to synchronize a content item comprising a plurality of blocks, wherein the plurality of client devices communicate with a local area network (LAN) and with the content management system that is on a network other than the LAN:

in response to receiving the synchronization notification, requesting, by the first client device, from the plurality of client devices a first block in a randomized blocklist, the randomized blocklist specifying a random order of the plurality of blocks;

in response to determining from the request that a second device of the plurality of client devices has a copy of the requested first block identified in the randomized blocklist, downloading the first block from the second client device; and in response to determining from the request that none of the plurality of client devices has a copy of the requested first block, downloading the requested first block from the content management system.

11. The method of claim 10, further comprising, in response to receiving from a third device of the plurality of client devices a request for the first block, sending the first block from the first client device to the third device, the third device including a second randomized blocklist specifying a second random order of the plurality of blocks and configured to request the first block in response to downloading blocks preceding the first block within the second randomized blocklist.

12. The method of claim 10, wherein the content item and the first client device are associated with a same namespace.

13. The method of claim 10, wherein requesting from the plurality of client devices communicating on the LAN a first block in the blocklist comprises:

receiving broadcasts from the one or more client devices communicating on the LAN, each broadcast identifying one or more namespaces associated with the broadcasting client device; and identifying from the received broadcasts, a group of one or more broadcasting client devices broadcasting a namespace associated with the first client device.

14. The method of claim 10, further comprising:

in response to determining that a third client device from the one or more client devices also communicating on the LAN has a copy of a second block identified in the blocklist, downloading the second block from the third client device.

15. The method of claim 10, wherein determining that the second client device from one or more client devices also communicating on the LAN has a copy of the first block identified in the blocklist and downloading the first block from the second client device, comprises:

sending a request to the second client device, the request including the randomized blocklist; and downloading blocks from the randomized blocklist that are stored on the second client device in the order of the randomized blocklist.

16. The method of claim 10, further comprising:

selecting the second client device from the one or more client devices communicating on the LAN based on network characteristics of the LAN; and sending a request to the second client device, the request requesting the first block.

17. The method of claim 10, wherein the request for the first block includes the randomized blocklist.

18. The method of claim 10, wherein the randomized blocklist is generated by the content management system.

19. A client device communicatively coupled to a plurality of other client devices via a local area network (LAN) and a content management system that is on a network other than the LAN, comprising:
   a non-transitory computer-readable storage medium storing instructions that, when executed, causes the client device to perform steps comprising:
     receiving, from the content management system, a synchronization notification indicating that the client device is to synchronize a content item comprising a plurality of blocks
     in response to receiving the synchronization notification, requesting from the plurality of other client devices communicating on the LAN a first block in a randomized blocklist, the randomized blocklist specifying a random order of the plurality of blocks;
     in response to determining from the request that a second device of the plurality of client devices has a copy of the requested first block identified in the randomized blocklist, downloading the first block from the second client device; and
     in response to determining from the request that none of the plurality of other client devices has a copy of the requested first block, downloading the requested first block from the content management system; and
   a processor configured to execute the computer instructions.

20. The client device of claim 19, wherein the instructions, when executed, further cause the client device to, in response to receiving from a third device of the plurality of client devices a request for the first block, send the first block to the third device, the third device including a second randomized blocklist specifying a second random order of the plurality of blocks and configured to request the first block in response to downloading blocks preceding the first block within the second randomized blocklist.

* * * * *